Aug. 23, 1960  L. P. FLATLAND  2,949,671
DENTAL HAND PIECE TRANSMISSION
Filed Sept. 15, 1955

INVENTOR.
LLOYD P. FLATLAND
BY
Lothrop & West
ATTORNEYS

United States Patent Office 2,949,671
Patented Aug. 23, 1960

2,949,671

DENTAL HAND PIECE TRANSMISSION

Lloyd P. Flatland, 370 22nd Ave., San Francisco, Calif.

Filed Sept. 15, 1955, Ser. No. 534,427

6 Claims. (Cl. 32—26)

The invention relates to dental hand pieces and, more particularly, to dental hand piece attachments which are capable of substantially increasing the rotational velocity of the cutting and excavating instruments utilized with dental hand pieces.

The present-day trend in the construction of dental cutting instruments, such as burrs and mounted points, is to increase greatly the hardness and wearability of the cutting and excavating heads. This is frequently accomplished either by the use of diamonds or carbide inserts.

In order fully to realize the capabilities of these improved types of instruments, however, it is necessary that the instruments be utilized at rotational velocities significantly exceeding the speeds presently provided by the customary dental units and involving the cord type of drive. With the present speeds available from the usual electric motor and cord drive, approximately 6500 r.p.m., there is very considerable heating and wear as well as vibration. These factors cause distress to both patient and doctor. Where the diamond or carbide tipped instruments are rotated at considerably higher speeds, however (for example, on the order of 12,000 to 25,000 r.p.m.'s or even higher), the foregoing objectionable characteristics are very largely eliminated, and far more satisfactory results to patient and dentist alike are effected.

In the past, attempts to produce the higher speeds on the instruments have been directed toward changes in the dental units themselves. For example, in some cases, by appropriate alterations in the motor, the motor speeds have been multiplied. In other dental unit installations, the speed of the drive cord has been stepped up as a consequence of installing various types of mechanical speed multipliers.

The difficulty, however, with adapting dental units and increasing the cord velocity is that a high cord speed produces excessive noise and vibration. Furthermore, at very high cord speeds the cord sometimes acts in an erratic fashion, the cord in some cases having become entangled with one portion or the other of the dental unit belt arm. The sudden entanglement has resulted, in a number of cases, in jerking the hand piece from the dentist's hand, with consequent serious harm to the patient by cutting the tongue, gums, lips or cheek.

It is therefore an object of the invention to provide a dental hand piece transmission which is safe in operation.

It is another object of the invention to provide a dental hand piece transmission having relatively few moving parts to get out of order.

It is yet another object of the invention to provide a dental hand piece transmission which can be quickly and easily attached to and detached from existing hand pieces.

It is a still further object of the invention to provide a dental hand piece attachment which steps up or multiplies or increases the rotational velocity of dental cutting instruments to the optimum speed for the particular instrument.

It is a further object of the invention to provide a dental hand piece transmission which circumvents the danger inherent in the stepping up of the speed of the electric motor and cord drive of a dental unit.

It is yet a further object of the invention to provide a hand piece transmission which is adaptable to all hand pieces, both existing and new.

It is yet a further object of the invention to provide a dental hand piece transmission which has a very short length of drive belt and which, therefore, provides a maximum of safety.

It is a still further object of the invention to provide a hand piece transmission which is fully as flexible and manipulable as existing hand piece connections, yet which provides a limit stop against excessive rotation of the hand piece with relation to the dental unit connection.

It is yet another object of the invention to provide a generally improved dental hand piece transmission.

Other objects, together with the foregoing, are attained in the following description and shown in the accompanying figures, in which Figure 1 is a side elevation of the transmission interposed between a typical hand piece sheath and a typical dental hand piece wrist joint.

Figure 1:
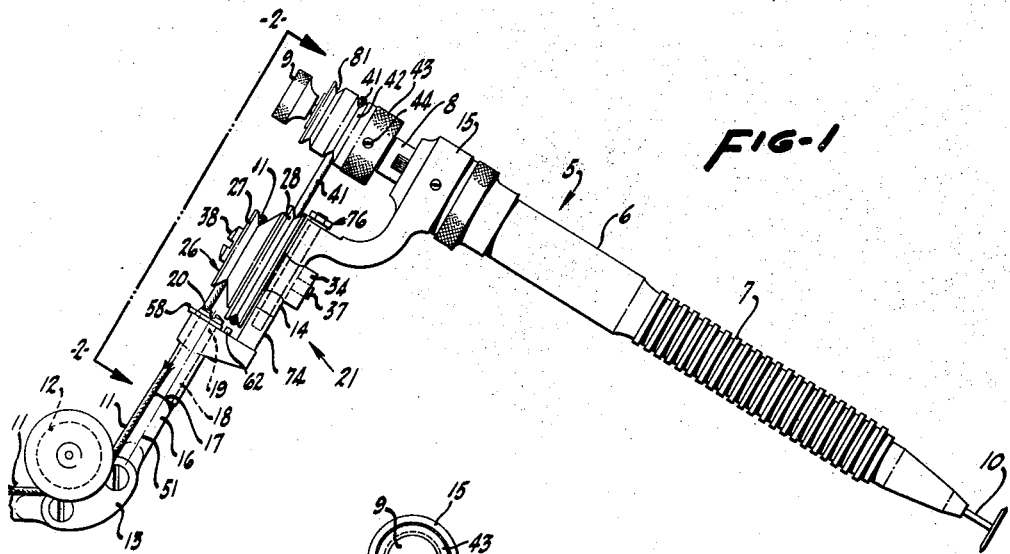
Figure 2:
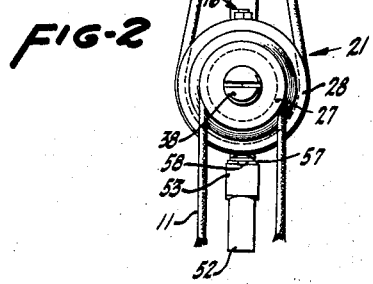
Figure 2 is an end view of the portion indicated by the line 2—2 of Figure 1.

While the dental hand piece transmission of my invention is susceptible of numerous physical embodiments, depending upon the particular environmental situation to be met, a number of the herein shown and described hand pieces have been made and used and have performed in an eminently satisfactory fashion.

A dental hand piece 5 ordinarily comprises a hollow sheath 6, or tube, having a finger-hold portion 7 formed therein to accommodate the user's hand. Journalled within the tube 6 is a rotatable stem 8 provided with a knurled nut 9 controlling a collet (not shown) suitable for holding a variety of dental cutting instruments 10, angle heads, etc. Rotation of the stem 8 is effected in the customary installation by an endless cord 11 reeved about a pulley (not shown) mounted on the upper end of the stem 8, the conventional pulley differing somewhat from the pulley shown. The endless cord 11 is led around a pair of pulley wheels 12 mounted on a wrist joint 13, the endless cord 11 being led over comparable pairs of pulley wheels (not shown) mounted on a series of intermediate elbows (not shown), the cord deriving its motion in the conventional fashion from an electric motor forming a part of the customary dental unit. Most dental hand pieces also include a hollow sleeve 14 disposed at right angles to the axis of the stem 8, the sleeve 14 being affixed to the hand piece member 6 by a mounting ring 15 secured, as by a set screw, to the hand piece.

Rockably mounted on the wrist joint 13 and extending toward the hand piece sheath 6 is a lug 16 stepped down at a shoulder 17, a tube 18 interiorly threaded at its outermost end 19 projecting outwardly from the shoulder 17. The sleeve 14 extending outwardly from the mounting ring 15 is, in the conventional installation, telescoped over the tube 18, abutted against the shoulder 17 and secured by an appropriate fastening such as a machine screw 20 in threaded engagement with the interior thread at the end 19 of the tube 18.

When the hand piece transmission of my invention, generally designated 21, is to be installed, the dental hand piece sleeve 14 is separated from the tube 18 by unscrewing the screw 20 and withdrawing the hand piece. The transmission is then interposed between the hand piece and the lug 16 and the members installed in the fashion hereinafter described.

In order to multiply, or step up, the rotational speed of the stem 8 to a considerably higher than ordinary rotational velocity, an intermediate set 26 of pulleys is provided between the cord 11 and the stem 8. The cord 11 is reeved about a cord pulley 27 mounted cheek to cheek on a larger belt pulley 28, both pulleys being mounted in press-fit relation with the outer race 29 of an anti-friction bearing 30 whose inner race 31 is in tight frictional engagement with a hollow stud 32 having a threaded opening 33. The stud 32 has an enlarged bottom portion 34, or lug, having an aperture 36 therein, at right angles to the axis of the pulley set 26, and adapted to fit over the sleeve 14 of the hand piece. The lug 34 is tightly secured to the sleeve 14 by a set screw 37. While the press-fit of the pulley set 26 on the anti-friction bearing and the tight engagement between the bearing and stud 32 would ordinarily prevent any endwise translation of the pulley set, even further security is provided by a cap screw 38 adapted for threaded engagement with the interior threads in the opening 33 in the hollow stud 32.

Since the belt pulley 28 is larger in diameter than the cord pulley 27, the angular velocity imparted to the cord pulley 27 by the cord 11 results in a higher rim speed or rim velocity for the belt pulley 28. This higher rim velocity is stepped up to an even greater extent by provision of a belt 41, the belt preferably having a circular or O-shaped cross section, reeved about the belt pulley 28 and disposed in a circular V-shaped groove 42 in a spindle 43 secured to the upper end of the hand piece stem 8 by a set screw 44. The diameter of the groove 42 is smaller than the diameter of the groove in the belt pulley 28 by a predetermined amount, and, by customary principles of belt transmission, the previously stepped up rim velocity of the belt pulley 28 is even further magnified or multiplied as the belt 41 impresses that velocity upon the smaller diameter of the spindle groove 42. As a consequence of the multiple step up, there is imparted to the stem 8 and thus to the dental instrument 10 a much greater angular speed of rotation than is encountered under transmissions of the type heretofore used.

Figure 3:
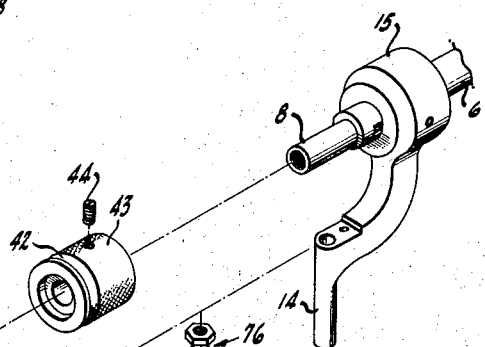
Figure 3 is an exploded perspective view of the transmission as well as the adjacent connecting portion of a typical dental hand piece sheath and the adjacent connecting portion of a typical hand piece wrist joint.
Figure 3:
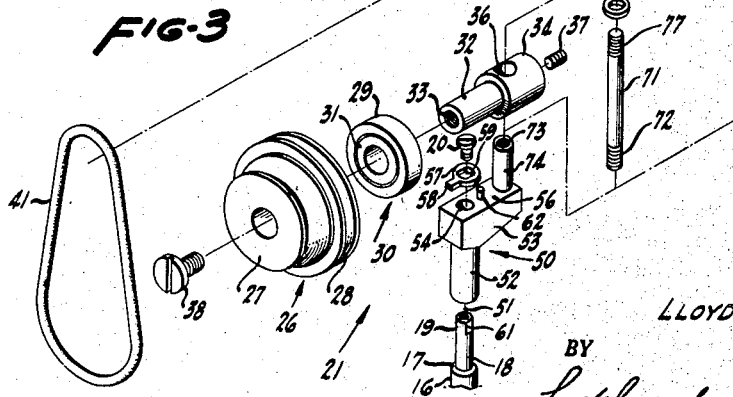

For greatest convenience in utilizing the hand piece, the hand piece must be free to rotate about an axis normal to the axis of the hand piece itself. Freedom of rotation about this normal axis 51 is achieved in present-day hand pieces by rotation of the hand piece sleeve 14 about the joint tube 18. It is achieved in the transmission of my invention by the provision of an offset link, generally designated 50, the link including a hollow sleeve 52 mounted on a crank-shaped member 53, or throw-block, which itself is provided with an aperture 54 in alignment with the opening in the hollow sleeve 52. As appears most clearly in Figure 3, the sleeve 52 and the block 53 are telescoped over the hollow tube 18, the sleeve abutting the shoulder 17 and the threaded opening at the upper end 19 of the tube 18 presenting itself at a location slightly above the aperture 54. The machine screw 20 is thereupon threaded into the threaded opening at the end 19 and serves to prevent separation of the block 53 from the tube 18 but allows free relative rotation to take place.

In order to avoid twisting of the cord 11, however, freedom of rotation of the block 53 and the hand piece 5 about the axis 51 is limited to a predetermined angular amount. Interposed between the screw 20 and the cheek 56 of the block 53 is a washer 57, or ring, having a lug 58, or spur, projecting radially therefrom. An opening 59 in the washer is flattened on opposite sides to mate with corresponding flattened portions 61 on the end of the tube 18, thus causing the washer 57 to rotate in unison with the tube 18 as relative motion takes place, about the axis 51, between the tube 18 and the block 53.

The block 53 is unable to swing through 360 degrees with respect to the tube 18, however, owing to the provision of a limit stop pin 62 mounted centrally on the block check 56. As the block 53 is rotated either in a clockwise or counterclockwise direction about the axis 51, the lug 58 comes into abutment with the limit stop pin 62 after a predetermined arc has been swept through, conveniently 160° to 165° from either side of the dead center relative position shown in the figures. Owing to the fact that the axis 51 lies substantially in the plane of the cord groove in the cord pulley 27, rotation of the pulley 27 around the axis 51 does not affect the rotational effort exerted by the moving cord on the pulley. Thus, while the cord pair is twisted well in excess of a quarter turn its rotational effort is not significantly changed. The limit stop member 62 prevents the cord from assuming a complete half turn, and thus chafing of the cord, by one run rubbing against the oppositely moving run, is avoided.

The hand piece is mounted on the transmission block 53 by sliding the sleeve 14 downwardly over a bolt 71 having its threaded lower end 72 in threaded engagement with a tapped opening 73 in a stud 74, or sleeve, upstanding from the block cheek 56. The lower end of the hand piece sleeve 14 is abutted against the upper surface of the stud 74 and is held securely in place owing to the provision of suitable fastenings 76 mounted on the upper end 77 of the bolt 71.

Although not shown in the figures, it is quite apparent that a suitably conformed shield could easily be mounted on the device so as to cover the pulley set and at least a portion of the O-ring belt runs should a user so desire.

It is further to be noted that by loosening the set screw 37 and moving the lug 34 slightly upwardly or downwardly on the sleeve 14 the tension on the cord 11 and the O-ring belt 41 can be adjusted to a desired amount and to compensate for dimensional changes which might take place in either the cord or the belt.

While the high rotational velocities attained by the transmission of my invention are greatly to be desired in connection with cutting and excavating, a considerably slower speed is utilized where teeth are to be cleaned. I have therefore provided on the upper end of the spindle 43 a groove 81 (shown only in Fig. 1) having substantially the same dimensions as the groove 42. When the patient's teeth are to be cleaned it is only necessary for the dentist to lengthen the cord 11 in the usual fashion provided for in most dental units, so that he cord 11 is reeved about the groove 81. This arrangement of parts enables the cord 11 to drive the spindle 43 directly, and, by an appropriate choice of motor speeds, the tooth-cleaning attachment can be rotated at a suitable low velocity. The diameter of the groove of the cord pulley 27 is preferably small enough with respect to the diameter of the groove 81 so that little, if any, rubbing of the cord takes place across the pulley 27 groove when the cord is reeved about the groove 81. However, some degree of rubbing is not particularly objectionable, and in any event, the O-ring belt need not be removed but can be allowed to remain in place during the direct, slow speed of operation.

It can therefore be seen that I have provided a highly flexible speed multiplying attachment for a dental hand piece which is as readily installable on existing hand pieces as on new ones incorporating my improvement, and which, furthermore, does not entail the costly modifications to the dental units themselves with the accompanying risk of harm resulting from high cord speed.

What is claimed is:

1. An apparatus for multiplying the rotational speed of a dental hand piece stem comprising a first pulley mounted on said stem, an offset link mounted on said hand piece and interposed between said hand piece stem and the adjacent connecting tube of a dental hand piece wrist joint, said offset link being rotatable with respect to said connecting tube, means on said link and said tube for limiting the relative rotation between said link and said tube to a predetermined angular amount, a stud mounted on said link, a second pulley rotatably mounted on said stud, a third pulley rotatably mounted on said stud and secured to said second pulley, said third pulley being rotatable by the cord drive of a dental unit, and means connecting said first pulley and said second pulley for effecting rotation of said first pulley as said second pulley is rotated.

2. A speed multiplier for use on a dental hand piece comprising an offset link including a throw block, a first hollow sleeve mounted on one side of said block, and a second hollow sleeve mounted on the other side of said block in spaced and parallel relation to said first sleeve, said block having an opening therein coaxial with the opening in said first hollow sleeve, a pin mounted on said throw block adjacent said second sleeve, a ring non-rotatably mounted on the free end of the connecting tube of a dental hand piece wrist joint, said tube being disposed within the openings in said first sleeve and in said block, said ring having a spur thereon adapted to abut said pin in predetermined positions of said offset link, a stud mounted on said hand piece, a double-grooved pulley means rotatably mounted on said stud, a spindle secured to the upper end of the rotatable stem of said hand piece, and a belt reeved about said spindle and one groove of said pulley means, the other groove of said pulley means having reeved thereon the driving cord of a dental operating unit.

3. A transmission for use with a dental operating unit having a wrist joint tube and carrying a cord and with a dental hand piece having a rotatable stem and a sleeve comprising a crank shaped member, a projection on said member telescoped with said tube, a stud on said member offset from said projection and in alignment with said sleeve, means for holding said projection and said stud against axial displacement relative to said tube and to said sleeve, a support on said sleeve, pulley means unitarily rotatable on said support and including a small pulley disposed to receive said cord and a large pulley, a spindle on said stem and having a groove in alignment with said large pulley, and a belt engaging said spindle and said large pulley.

4. A transmission for use with a dental operating unit having a wrist joint tube and with a hand piece having a sleeve comprising a block, a projection on said block adapted to be journalled on said tube about a first axis, a stud on said block extending on a second axis parallel to said first axis and offset therefrom a predetermined distance, means for fastening said sleeve to said stud, pulley means including a small pulley and a large pulley, and means projecting from said fastened sleeve and stud for rotatably supporting said pulley means for rotation about a third axis at right angles to and intersecting said first axis and said second axis.

5. A transmission for use with a dental operating unit having a wrist joint tube and with a hand piece having a sleeve comprising a block adapted to be interposed between said tube and said sleeve, a projection on said block rotatably engaging said tube for rotation about a first axis, means for limiting said projection and said tube to restricted relative rotation about said first axis and against movement along said first axis, a stud on said block extending on a second axis parallel to said first axis and offset therefrom, means for holding said stud and said sleeve together against relative rotation and against movement along said second axis, pulley means including a small pulley and a large pulley unitarily rotatable, and means adapted to be fixed with respect to said block for supporting said pulley means for rotation about a third axis at right angles to and intersecting said first axis and said second axis.

6. A transmission for use with a dental operating unit having a wrist joint tube and with a hand piece having a sleeve comprising a block adapted to be interposed between said wrist joint and said hand piece, means extending from opposite sides of said block and in axially offset relationship for engagement with said tube and said sleeve respectively, pulley means including a large pulley joined to a small pulley, means associated with said block for rotatably mounting said pulley means, a belt engaging said large pulley and extending toward said hand piece, and a cord engaging said small pulley and extending toward said wrist joint, said belt and said cord being in a similar axially offset relationship.

References Cited in the file of this patent

UNITED STATES PATENTS

| | | |
|---|---|---|
| 1,636,758 | Renna et al. | July 26, 1927 |
| 2,078,859 | Lapham | Apr. 27, 1937 |